Figure 1:
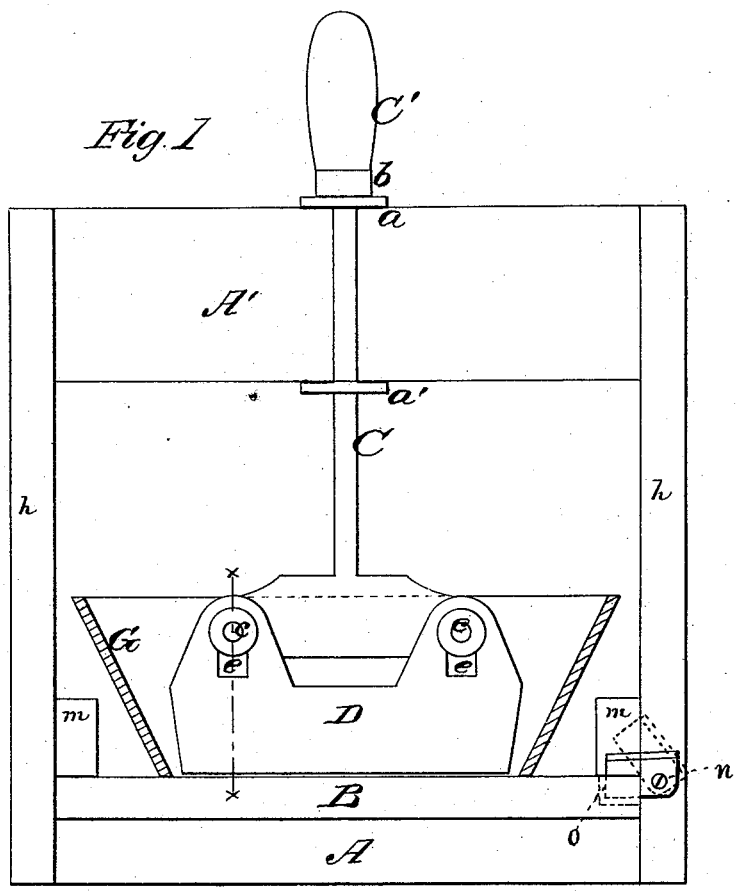

J. PERKINS.
Meat-Chopper.

No. 160,225.

Patented Feb. 23, 1875.

WITNESSES
Mary J. Utley.
Robert Everitt.

INVENTOR
Joshua Perkins
Chipman & Fosmer & Co.
Attorneys

THE GRAPHIC CO.PHOTO-LITH.39 & 41 PARK PLACE,N.Y.

UNITED STATES PATENT OFFICE.

JOSHUA PERKINS, OF DANIELSONVILLE, CONNECTICUT.

IMPROVEMENT IN MEAT-CHOPPERS.

Specification forming part of Letters Patent No. 160,225, dated February 23, 1875; application filed July 18, 1874.

*To all whom it may concern:*

Be it known that I, JOSHUA PERKINS, of Danielsonville, in the county of Windham and State of Connecticut, have invented a new and valuable Improvement in Meat and Vegetable Cutter; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a front view of my meat and vegetable cutter. Fig. 2 is a sectional view of the same.

This invention has relation to meat and vegetable cutters, wherein the knife-blades are secured to a rod which is allowed to receive vertical and rotary motions. My invention consists in the employment of a bottomless pan resting on a detachable wooden block immediately under the cutters, the said bottom or block being held securely in place by cleats on the uprights and a catch, while, at the same time, it may readily be slid from under the cutters, when desired.

In the annexed drawing, A designates the horizontal base of the supporting-frame, on which a chopping block or board, B, is removably applied. From the sides of the base A rise two standards having a horizontal crosshead, A', rigidly secured to their upper ends. C designates the knife-rod, which is held in a vertical position by means of guides $a\, a'$, rigidly secured to the cross-head A'. The upper end of the rod C has a handle, C', secured to it, below which is a shoulder, $b$, which is rigidly secured on the rod C in such a position that it will strike upon the upper guide $a$ and arrest the descent of the rod before the cutting-edges of the knives D can touch the chopping-board B. The said shoulder and stop-guide will thus prevent the board B from being injured by the knives. The knives D are secured to the lower end of the knife-rod C by means of bolts $c$ and interposed washers $d$, and, by loosening the nuts on said bolts $c$, slots $e$ through the knives will allow them to be adjusted up or down, and set so that they will nearly touch the chopping-board. This adjustability of the knives is necessary, when the shoulder and stop-guide for rod C are used, in order that they may be lowered as they are worn away and their cutting-edges kept at the proper distance from the board B. G is a bottomless vessel, preferably made of metal, the lower end of which is attached by lugs to the chopping-boards B. $m\, m$ are horizontal cleats attached to the uprights $h\, h$ near their lower end, leaving a sufficient space between the lower bases of the cleats and the base A of the machine for sliding in and out the chopping-block B, carrying the vessel G. $n$ is a catch pivoted to one of the standards $h$, and made to engage in a slot, $o$, in the upper face of the chopping-block B to hold the latter in position when introduced beneath the knives. By this construction it will be seen, after the meat is introduced into the vessel G, thoroughly cut up or minced, the chopping-block, with its attached vessel G, can readily be removed from the machine and the chopped meat deposited where desired. The catch $n$, engaging with the slot $o$ in the chopping-block B, holds the latter securely in place while the meat is being chopped.

What I claim as new, and desire to secure by Letters Patent, is—

The detachable chopping-block B, carrying the bottomless vessel G, and provided with a slot, $o$, in combination with the base A, cleats $m\, m$ on the uprights $h\, h$, catch $n$, and cutters D, capable of being raised above the vessel G, substantially as specified.

In testimony that I claim the above I have hereunto subscribed my name in the presence of two witnesses.

JOSHUA PERKINS.

Witnesses:
 MARSHALL P. DOWE,
 AMASA DOWE.